United States Patent

[11] 3,609,592

[72] Inventor Gaston Raval La Neuveville, Switzerland
[21] Appl. No. 832,148
[22] Filed June 11, 1969
[45] Patented Sept. 28, 1971
[73] Assignee Omega Louis Brandt & Frere S.A. Bienne, Switzerland
[32] Priority June 19, 1968
[33] Switzerland
[31] 9132/68

[54] TWO-TERMINAL AMPLIFIER ADAPTED TO BE COUPLED TO A RESONATOR
12 Claims, 7 Drawing Figs.

[52] U.S. Cl. .......... 331/116, 307/288, 307/313, 331/108.3, 331/113.1, 331/117
[51] Int. Cl. .......... H03b 5/30
[50] Field of Search .......... 307/288, 313; 331/116, 116 M, 113, 114, 117, 113.1, 117 D, 108.3

[56] References Cited
UNITED STATES PATENTS
3,061,797 10/1962 Grenier .......... 331/108 (.3) X
3,185,940 5/1965 Abbott et al. .......... 331/108 (.3) X

*Primary Examiner*—Alfred L. Brody
*Attorney*—Edward T. Connors

ABSTRACT: A two-terminal amplifier adapted to be connected to a resonator, the amplifier of simple and small design, particularly for use in timepieces, having two complementary transistors series-connected and a single coil coupled with a resonator and connected between the collectors of said transistors.

INVENTOR
GASTON RAVAL
BY
ATTORNEY

TWO-TERMINAL AMPLIFIER ADAPTED TO BE COUPLED TO A RESONATOR

This invention relates to an amplifier, particularly for a timepiece, of the type having a resonator coupled to the amplifier which has two terminals and which is adapted to sustain oscillation of the resonator. Amplifiers of this type are particularly simple in that the resonator, for instance a tuning fork or a balance wheel, may be coupled to the amplifier by means of a single coil having two terminals. This possibility is of particular importance when the coupling coil is mounted on the balance wheel of a timepiece. It is not only easier to make the necessary connections to one single coil, but it is also easier to manufacture a simple coil having two terminals instead of a coil having a tapping.

On the other hand, prior two-terminal amplifiers used for sustaining oscillation of a resonator in a timepiece are relatively complicated compared with four-terminal amplifiers controlled by a separate control coil or coil portion. Further, prior amplifiers often require expensive elements difficult to obtain in the desired dimensions for use in timepieces, for instance resistors of extremely high values.

It is an object of this invention to provide a two-terminal amplifier of the above type which is simple but highly efficient. This amplifier is broadly characterized by two complementary transistors connected in series, the collector of each transistor being connected to one of said terminals and the base of each transistor being coupled to the collector of the other transistor.

This circuit is very simple and has favorable starting conditions and high stability without requiring circuit elements of unusual values or characteristics. This amplifier may be used in a wide field, practically independently of the frequency of the resonator which may be a balance wheel, a tuning fork, an electric oscillating circuit or any equivalent thereof, for instance a piezo-electric quartz. Particularly, the amplifier may be designed without any capacitive coupling such that the characteristics of the amplifier are practically independent of the frequency of usual oscillators for timepieces. In order to stabilize the circuit it is preferred to provide a stabilizing resistor in the emitter circuit of one or both transistors or coupling resistors with proper temperature coefficient.

Figure 3:
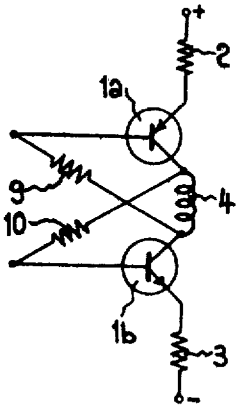
Figure 4:
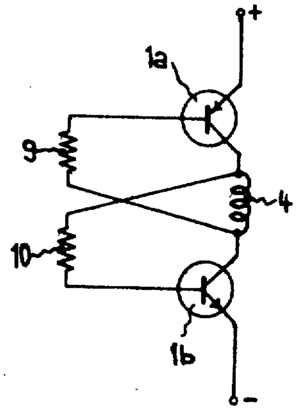
Figure 5:
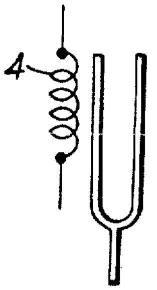
Figure 6:
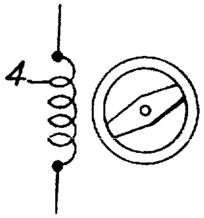
Figure 7:
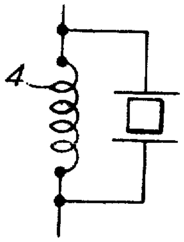

A few embodiments of the invention will now be explained by way of example with reference to the accompanying drawing wherein:

FIGS. 1 to 4 illustrate each the electric circuit diagram of one embodiment, and FIGS. 5 to 7 schematically illustrate various resonators coupled with the amplifier.

Figure 1:
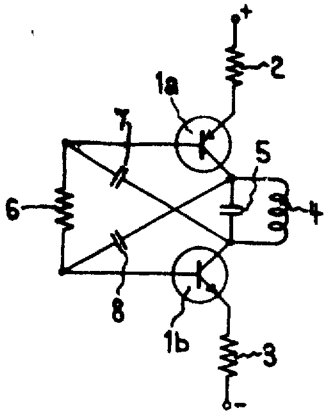

The circuit shown in FIG. 1 has two complementary transistors **1*a* and 1*b*. By means of resistors 2 and 3 the emitters of transistors 1*a* and 1*b* are connected to the positive and negative terminal respectively of a power source, for instance a miniaturized element having a voltage of 1.35 v. The collectors of transistors 1*a* and 1*b*, constituting the terminals of the amplifier, are connected to the terminals of a coil 4 and of a condenser 5 connected in parallel with coil 4. In a manner schematically illustrated in FIGS. 5 and 6, coil 4 is electrodynamically coupled to a mechanical resonator, for instance a balance wheel or tuning fork. Coupling means of this type are shown, by way of example, in U.S. Pat. Nos. 3,238,431 and 2,960,817. The bases of transistors 1*a* and 1*b* are interconnected by a bias resistor 6. The base of each transistor is connected to the collector of the other transistor by means of coupling condensers 7 and 8** respectively.

Signals induced in coil 4 by any initial oscillation of the resonator are simultaneously amplified by both transistors and the amplitude of the resonator rapidly increases and is sustained at a suitable value. It was found that the amplifier shown in FIG. 1 allows rapid starting of the oscillation due to the hard coupling by condensers 7 and 8. The oscillating circuit formed by coil 4 and condenser 5 may be tuned at least approximately to the resonance frequency of the resonator. The circuit is not substantially affected by changes of the voltage of the source and of the temperature, particularly due to the effect of the negative feedback obtained by resistors 2 and 3.

Figure 2:
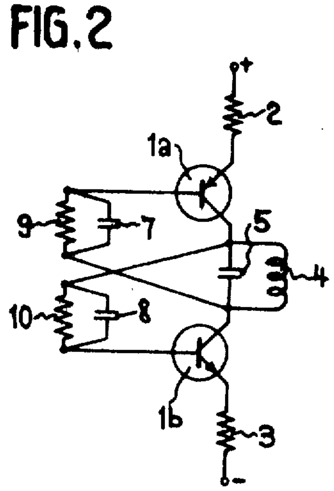

The circuit shown in FIG. 2 substantially corresponds to the one shown in FIG. 1 except for the coupling circuits between the collectors and bases of the transistors. These coupling circuits comprise parallel RC-circuits formed by condensers 7 and 8 and resistors 9 and 10 respectively. The base bias is directly obtained through resistors 9 and 10 whereby the biasing resistor 6 may be dispensed with. Otherwise the circuit of FIG. 2 and its characteristics are similar to those of the circuit shown in FIG. 1.

The following list shows suitable values of the elements used in the circuit of FIG. 2 for sustaining the oscillation of a tuning fork at a frequency of 414 Hz.

| | |
|---|---|
| Resistors 2 and 3 | 3,900 Ohms |
| Resistors 9 and 10 | 1 Mohm |
| Condensers 7 and 8 | 0.22 μf |
| Condenser 5 | 2,200 pf |
| Consumption | 9 μA |

Current consumption increases to 17 microamps during starting up of the oscillation, this showing that the feedback in the amplifier and the starting speed are very good and self-starting of the oscillator is obtained.

The same circuit with somewhat different values of the elements may be used for sustaining the oscillation of a balance wheel at a frequency of 5 Hz. The values of the elements are as follows:

| | |
|---|---|
| Resistors 2 and 3 | 560 Ohms |
| Resistors 9 and 10 | 0.47 Mohms |
| Condensers 7 and 8 | 0.47 μf |
| Condenser 5 | 0.22 μf |
| Consumption | 9 μA |
| Maximum consumption during start | 35 μA |

FIG. 3 shows a simplified embodiment wherein the capacitive coupling is replaced by a simple direct coupling by resistors 9 and 10 corresponding to resistors 9 and 10 shown in FIG. 2. The condenser 5 is also omitted. It is found that the circuit shown in FIG. 3 is also stable but the power consumption is somewhat higher because the alternating component flows through resistors 9 and 10.

FIG. 4 shows an embodiment further simplified in that the negative-feedback resistors 2 and 3 are omitted. In order to obtain sufficient temperature stability it is preferable to use elements with suitable temperature coefficient, for instance PTC-resistors 9 and 10.

The circuits described above are characterized by a certain symmetry, that its, the coupling elements and negative-feedback resistors are equal for both transistors. However, asymmetric circuits may be used having favorable characteristics. As an example, elements 2 and 7 may be omitted in the circuit of FIG. 2. The values of the remaining elements may be as follows:

| | |
|---|---|
| Resistor 3 | 3,900 Ohms |
| Resistor 9 | 1,2 Mohms |
| Resistor 10 | 4,7 Mohms |
| Condenser 5 | 2,200 pf |
| Condenser 8 | 0.22 μf |
| Consumption | 10 to 10.5 μA |

Moreover, it was found that the stability of the described circuits may be improved by connecting a resistor between the base and the emitter circuit of at least one of the transistors. This resistor may be connected to the emitter or to the positive or negative terminal of the source.

As mentioned above, the described circuits may be used together with any resonator. Particularly, electric resonators such as the oscillating circuit 4, 5 as shown in FIGS. 1 and 2 or a quartz as shown in FIG. 7 may be used.

The amplifiers described above may be used in any other application other than in the oscillator of a timepiece.

What I claim is:

1. A two-terminal amplifier for operation practically independently of frequency and adapted to be coupled to a resonator for sustaining oscillation of said resonator, said amplifier including two complementary transistors connected in series, the collector of one transistor being connected to one of said terminals and the collector of the other transistor being connected to the other of said terminals, the base of each transistor being coupled to the collector of the other transistor, an energy source connected between the emitters of said transistors, and at least one bias resistor connected between the base of each transistor and an electrode of the other transistor.

2. A two-terminal amplifier according to claim 1, comprising a mechanical resonator such as a tuning fork or balance wheel and electrodynamic coupling by means of a coil between the resonator amplifier.

3. A two-terminal amplifier according to claim 1, comprising coupling resistors between the collectors and bases of the transistors.

4. A two-terminal amplifier according to claim 1, comprising coupling capacitors between the collectors and bases of the transistors.

5. A two-terminal amplifier according to claim 1, comprising parallel RC-coupling circuits between the collectors and bases of the transistors.

6. A two-terminal amplifier according to claim 1, comprising a power source and a resistor connected between the emitter of at least one of said transistors and the one terminal of said source.

7. A two-terminal amplifier according to claim 3, wherein positive temperature coefficient resistors are used as coupling resistors.

8. An oscillator according to claim 2, comprising a condenser connected in parallel with said coil.

9. A two-terminal amplifier according to claim 8, comprising a resistor connected between the base and the emitter circuit of at least one of said transistors.

10. A two-terminal amplifier according to claim 1, characterized by coupling circuits of different type connected to the bases of said transistors.

11. A two-terminal amplifier according to claim 1, wherein negative temperature coefficient resistors are connected for temperature compensation.

12. A two-terminal amplifier according to claim 1, wherein a quartz is connected to the amplifier terminals.